United States Patent [19]

Holsworth

[11] Patent Number: 4,491,275
[45] Date of Patent: Jan. 1, 1985

[54] DISPENSER FOR ROAD VEHICLE

[76] Inventor: Herbert Holsworth, 1267 Muskingum, Pontiac, Mich. 48054

[21] Appl. No.: 392,761

[22] Filed: Jun. 28, 1982

[51] Int. Cl.³ .............................................. A01C 3/06
[52] U.S. Cl. .................... 239/663; 239/687; 222/609; 222/505; 37/DIG. 12
[58] Field of Search ............... 222/160, 164, 166, 485, 222/505, 559, 561, 608, 609, 610, 626; 239/663, 687, 665, 666; 37/3, DIG. 12

[56] References Cited

U.S. PATENT DOCUMENTS

| | | | |
|---|---|---|---|
| 2,010,287 | 8/1935 | Anderson | 239/666 |
| 2,687,307 | 8/1954 | Austermiller | 239/687 |
| 3,065,556 | 11/1962 | Kampert | 239/663 |
| 3,191,944 | 6/1965 | Watts | 222/610 X |
| 4,201,000 | 5/1980 | Stanford | 37/117.5 |

Primary Examiner—Joseph J. Rolla
Assistant Examiner—Michael S. Huppert
Attorney, Agent, or Firm—John R. Benefiel

[57] ABSTRACT

A dispenser is disclosed detachably secured to the front or rear of a vehicle to enable spreading of road salt or other granular material.

In a first embodiment the dispenser is detachably mounted to the upper edge of a snow plow blade. A slidable damper plate regulates the flow of material from a hopper onto a multi-speed spreader rotor, which causes an even dispersion of the material by directing it outwardly and against the forward surface of the snow plow blade.

The damper plate is positioned by a cable system causing sliding of the plate by tilting of the snow plow blade, with a visual indicator enabling viewing of the plate position within the vehicle cab.

In a second embodiment, the dispenser is detachably mounted to the rear bumper of a motor vehicle and the damper plate is actuated by means of an electromechanical actuator. A deflector shield is positioned across the rear of the vehicle to deflect the dispensed material directed thereagainst by the spreader rotor.

10 Claims, 10 Drawing Figures

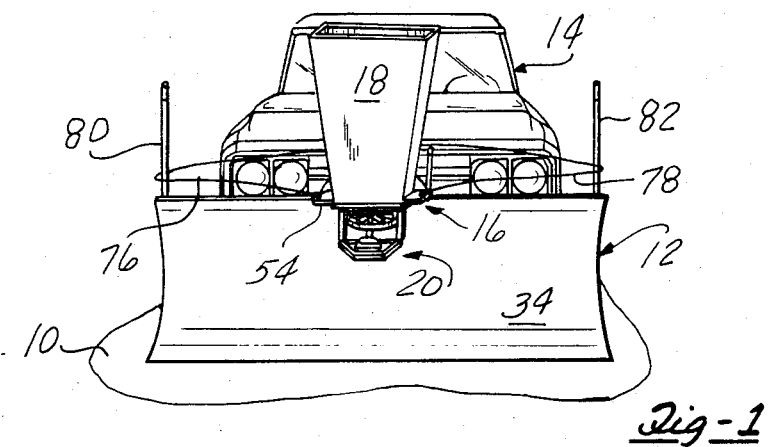
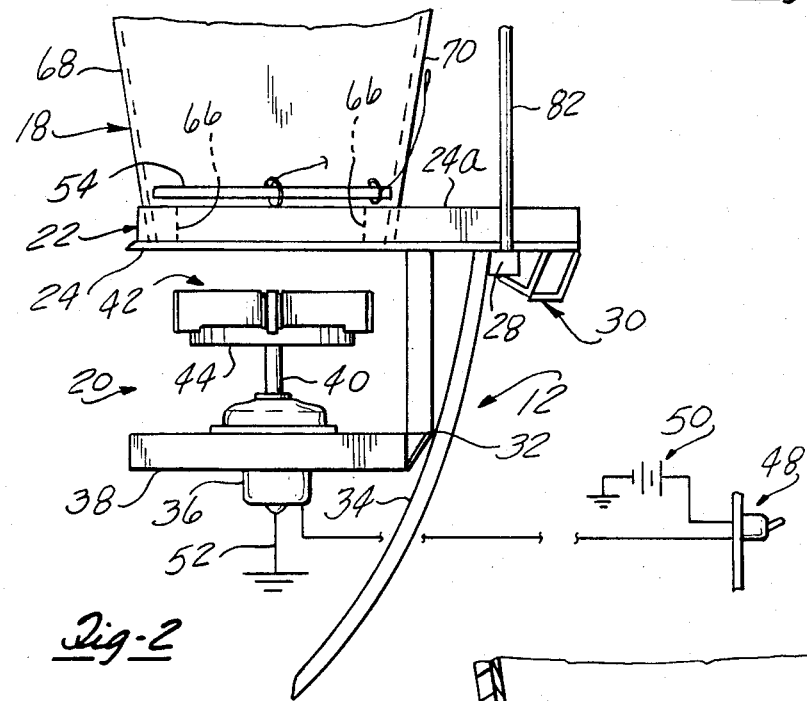
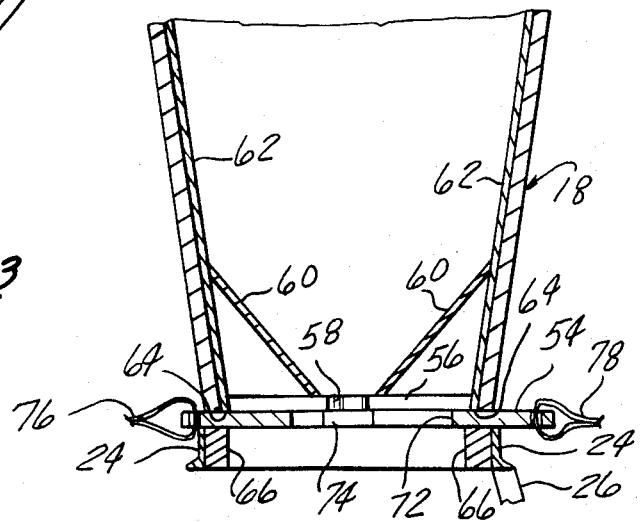

4,491,275

DISPENSER FOR ROAD VEHICLE

BACKGROUND OF THE INVENTION

This invention concerns dispensers, and more particularly dispensers adapted to be detachably mounted to a motor vehicle and to distribute granular material on a traversed road surface.

Dispensers or spreaders have long been used in combination with road vehicles such as trucks equipped with snow plows which dispensers have been adapted to cause road salt or sand to be dispersed on the road surface.

The usual arrangement has included a dispersion rotor which is rotated as a flow of granular material is directed onto the rotor, with the supply of granular material from a truck mounted bin or a hopper mounted to the motor vehicle bumper.

The conventional arrangement has been to mount the dispenser to the rear and one side of the road vehicle. Such location, however, has the disadvantage of allowing considerable spray to contact the dispenser, which in turn causes rapid corrosion and jamming of the components. The rear mounting also creates a high degree of vulnerability to collision damage as the vehicle is backed up. The material, being thrown outward by the rotor, also has a tendency to become lodged in the vehicle underparts causing corrosion damage to the vehicle itself.

In addition, the usual arrangement involves a more or less permanent mounting of the dispenser arrangement to the vehicle, necessitating a time consuming disassembly of the dispenser arrangement to remove the dispenser from the vehicle.

The prior art dispensers created relatively uneven dispersion patterns and do not enable differing spread densities of the material.

These factors contribute to a relative lack of efficiency in the use of the spread material inasmuch as uniformity of spread is seldom achieved.

With increasing amounts of snow fall, road salting is of increasing importance to eliminate a portion of the snow fall, in order to prevent the accumulation of snow beyond the capacity of the available space to plow the snow into. That is, it may become necessary to melt off light snow falls in a given snow season in order to prevent excessive accumulation.

The use of road salt or sand in commercial and residential driveways and parking lots is also highly desirable.

For such applications, it would be advantageous to provide a dispenser suitable for ready attachment and detachment to light trucks and four-wheel drive vehicles which are equipped with snow plow blades for the purpose of private or commercial snow clearing operations.

In such commercial and private use of the dispenser arrangement, it would, of course, be highly desirable that the cost of such dispensers be at a minimum and the controls over the dispensing be simple, reliable, and trouble-free.

Accordingly, it is an object of the present invention to provide a dispenser arrangement for the spreading of granular material on the road surface by road vehicles.

It is another object of the present invention to provide such dispenser arrangement which is readily attached and detached from motor vehicles.

It is still another object of the present invention to provide such a dispenser arrangement which is itself protected from the corrosive effects of road spray, while protecting the vehicle underbody from the road salt.

It is yet another object of the present invention to provide such a dispenser arrangement which produces a more uniform spreading of the granular material on the road surface.

It is still another object of the present invention to provide such a dispenser arrangement which enables a ready control over the density of the spreading of the granular material on the road surface.

It is still another object of the present invention to provide such a dispenser arrangement in which a very simple and reliable control over the dispensing of the granular material is enabled.

SUMMARY OF THE INVENTION

These and other objects of the present invention are provided by a dispenser arrangement comprised of a supply hopper and a spreader rotor positioned beneath bottom openings in the hopper, with a damper plate controlling outflow onto the rotor to cause spreading of the granular material.

In a first embodiment, the dispenser arrangement is detachably mounted to the top edge of a snow plow blade mounted to the vehicle, and forwardly thereof so that impacting of the granular meterial dispersed by the rotor spreader produces a uniform spread pattern on the roadway surface.

In a second embodiment, the dispenser arrangement is detachably mounted to the central location on the rear of the motor vehicle, and for this embodiment a separate deflector shield is affixed or mounted to the vehicle bumper extending across the width thereof at the level of the rotor spreader to provide the same function, and to protect the rear and underbody of the vehicle.

The hopper feed from the hopper is controlled by a damper plate, which plate is slidably mounted beneath the hopper bottom openings, and is positionable in an open or closed position in order to control flow of the granular material from the hopper onto the rotor spreader. The damper plate is configured with relieved areas into which project closure blades which have clearance spaces about three sides thereof such that a tendency for jamming of the granular material is greatly reduced during sliding movements of the damper plate between its respective positions.

In the first embodiment, the damper positioning is achieved by a cable system affixed to either end of the damper plate, lengths of which are passed around the snow plow structure and anchored to a central fixed point on the vehicle or the snow plow mounting frame.

The normal snow plow blade tilting motion enables manipulation of the damper plate position between the open or closed positions, without the need for separate controls or actuators.

In the second, rear mounted embodiment, an actuator motor and linkage is provided which is actuated to provide the motion of the damper plate.

In each embodiment the spreader rotor is rotated by means of an aligned electric three-speed drive motor to vary the dispersal pattern corresponding with the rate of flow of the granular material and the speed of the vehicle.

Each embodiment also may be provided with an indicator element secured to the damper plate and projecting upwardly to be visible from the vehicle cab relative to a marked position located on the hopper surface. The damper plate moving between open and closed positions moves the indicator element into and out of registry with the indicator mark to provide an indication of the position of the damper blade to the vehicle operator without dismounting from the cab.

BRIEF DESCRIPTION OF THE DRAWINGS

FIG. 1 is a frontal view of a motor vehicle equipped with a snow plow blade, on which a dispenser arrangement according to the present invention is mounted.

FIG. 2 is a fragmentary side elevational view of the dispenser arrangement installed on the snow plow blade as shown in FIG. 1.

FIG. 3 is a fragmentary sectional view of a portion of the dispenser arrangement as shown in FIGS. 1 and 2.

DETAILED DESCRIPTION

Figure 4:
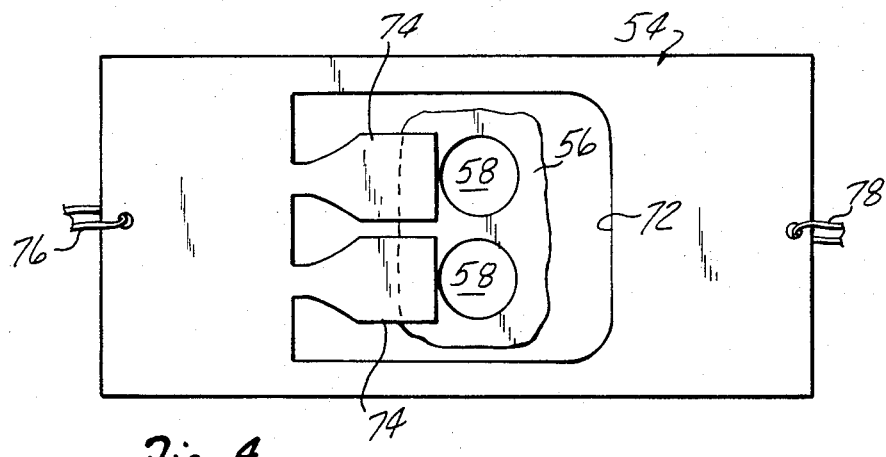
FIG. 4 is an upward plan view of a damper plate and dispenser openings with the damper plate in the fully opened position.

In the following detailed description, certain specific terminology will be employed for the sake of clarity and a particular embodiment described in accordance with 35USC112, but it is to be understood that the same is not intended to be limiting and indeed should not be so construed inasmuch as the invention is capable of taking many forms and variations within the scope of the appended claims.

Referring then to the drawings and particularly FIG. 1, the dispenser arrangement according to the first embodiment of the present invention is adapted to be detachably mounted to a snow plow blade 12 mounted in the forward end of a motor vehicle 14.

Such snow plow blades are used to clear snow from road surfaces 10 such as driveways, roads, parking lots, etc., in a manner well known in the art. Such snow plow blades 12 are conventionally mounted to be angled towards one side of the vehicle or the other by means of a hydraulic actuation mechanism (not shown) in order to direct plowed snow to one side of the vehicle or the other.

Accordingly, the snow plow blade 12 is able to be tilted to one side or the other of the vehicle 14.

According to the concept of the present invention the dispenser arrangement 16 is detachably mounted to the upper edge and forward side of the snow plow blade 12. The front surface of the blade 12 cooperates with the dispenser arrangement 16 to provide a uniform dispersal pattern of a granular material to be spread such as road salt.

The forward mounted position of the dispenser arrangement 16 provides an advantageous location inasmuch as it is not subjected to road spray generated by the motor vehicle wheels and avoids the problems of corrosion produced by the often salt laden moisture, and freeze-up of the moving parts.

Furthermore, this avoids the vulnerability of rear mounted dispensers which, as noted, are subject to damage as the vehicle is backed up into unseen obstructions.

The dispenser arrangement 16 includes an open-topped dispenser hopper 18 adapted to receive and hold a supply of the granular material to be spread, and a rotor spreader 20 mounted beneath the hopper 18, both of which are joined together to form the dispenser arrangement 16.

A suitable frame 22, as of welded angle iron, receives the lower end of the hopper 18, which frame includes a horizontally extending square frame 24. A lower frame 26 welded or secured thereto mounts the spreader rotor 20 directly beneath the hopper 18. The frame 22 also includes rear extensions 24(a) adapted to extend over the upper ede reinforcement 28 of the snow plow blade 12 hooked thereover by a welded catch rail 30 extending across the rear extensions 24(a).

The spreader rotor support frame 26 is configured with a corner 32 which rests against the front surface 34 of the snow plow blade 12. The catch rail 30 provides a readily removable yet secured mounting means for positioning the dispenser assembly 16 over the forward surface 34 of the snow plow blade 12.

Figure 5:
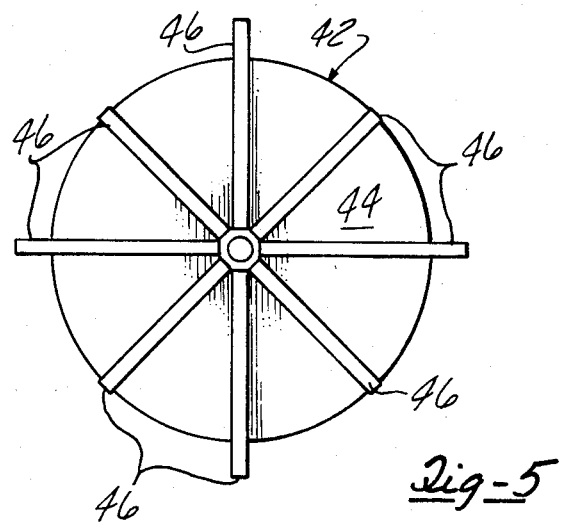
FIG. 5 is a plan view of the spreader rotor incorporated in the dispenser arrangement shown in FIGS. 1-4.

The spreader rotor 20 includes a three-speed electric motor 36 supported on a frame member 38, the motor 36 having an output shaft 40 substantially aligned beneath the dispenser hopper 18. Affixed to the electric motor output shaft 40 is a spreader rotor member 42 consisting of a hub 44 carrying a plurality of radially extending vanes 46 located affixed to the hub 44 and affixed to the upper surface thereon such as to be positioned immediately below the hopper 18. As seen in FIG. 5, there is preferably provided eight equally spaced vanes 46, which may be of alternate long and short dimensions as shown.

Energization of the electric motor 36 is controlled by a dash mounted switch 48 which controls the making of the circuit connection to the vehicle battery 50 or other power source which is to energize the electric motor 36 to cause rotation of the spreader rotor member 42.

The switch 48 is a three position switch to enable a three-speed operation of the electric rotor motor 36 to provide a greater or lesser area dispersal pattern depending on the desired density of coverage and the vehicle speed.

The outflow from the hopper 18 is thus directed onto the rotating vanes 46 of the spreader rotor member 42 and caused to be dispersed radially outward by slinging action of the vanes with respect to the granular material.

According to one aspect of the present invention the rotating vanes are positioned adjacent the upper forward surface 34 of the snow plow blade 12 which acts, as has been discovered by the present inventor, to cause a relatively uniform dispersion or spread pattern of the granular material on the ground or road surface over which the vehicle 14 is being driven. At the same time, the blade 12 protects the vehicle from receiving any of the road salt while still allowing a wide area, uniform spread pattern.

The three-speed cabability of the rotor enables excellent control over the density of the spread of granular material on the road surface.

The dispenser arrangement 16 also includes means for controllably establishing outflow from the hopper 18 which means includes a slidably mounted damper plate 54 (FIG. 3) which is positioned beneath a bottom plate 56 of the hopper 18. The bottom plate 56 is provided with one or more bottom openings 58 with interior partitions 60 provided to direct the granular material to the one or more openings 58. The partitions 60 are mounted against the bottom plate 56 and the side plate 62. The damper plate 54 is fit within a slot 64 and the side plates 62 of the hopper 18 and atop the frame members 24. Frame members 24 are affixed to a bottom frame 66 of the hopper 18 which in turn are affixed to front and rear plates 68 and 70 respectively.

Figure 4A:
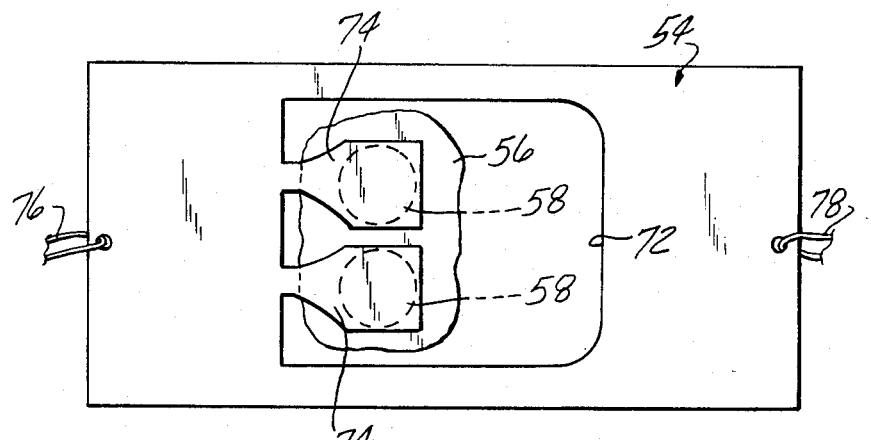
FIG. 4(A) depicts the damper blade plate position corresponding to the fully closed position in which the dispenser hopper openings are completely covered.

Referring to FIGS. 4 and 4(A), the action of the damper plate 54 in controllably establishing outflow of granular material from the hopper 18 can be understood.

A pair of hopper bottom openings 58 are provided and the damper plate 54 is provided with an opening 72 into which project a pair of blades 74 which are integral with the damper plate 54.

Blades 74 projecting into the opening cutout 72 are relieved such as to provide a clearance space on three sides thereof. In the first slidable position of the damper blade 74 the damper blade 74 is clear of the hopper openings 58 such as to enable outflow of granular material from the hopper 18 through the openings 58 and onto the rotor member 42.

In a second lateral position, the damper plate 54 and damper blade 74 are advanced to completely cover the underside of the bottom openings 58 such as to cutoff flow to the outflow from the hopper 18. The three sided clearance adjacent the damper blades 74 minimize the tendency for jamming of the granular material into the clearance spaces between the damper blade and the bottom 56 since the granular material will be able to pass into the clearance spaces freely. This arrangement thus minimizes the potential jam-up conditions caused by positioning of the damper plate 54.

Referring again to FIG. 1, means are provided for controllably establishing the position of the damper blade 54 in those positions corresponding to the opening and closing of the hopper bottom openings 58. In employing the invention in conjunction with a snow plow blade equipped vehicle, there is provided means utilizing the tilt positioning of the snow plow blade 12 to produce the damper plate 54 positioning.

This means includes a pair of cables 76 and 78 affixed to exposed opposite ends of the damper plate 54 passed about the left and right guide rods 80 and 82 respectively which are normally provided extending from the upper edge of the snow plow blade 12 in order to enable ready visibility of the position of the outboard edges of the snow plow blade 12 to the vehicle operator.

Each of the cables 76 and 78 is then affixed to a stationary structure on the snow plow mounting frame or vehicle. Thus upon tilting in either direction of the snow plow blade 12 the damper plate 54 is shifted to the right or to the left and correspondingly to the open or closed position of the openings 58.

Accordingly, the existing hydraulic actuator normally provided in conventional snow plow blade mounting arrangements is relied on to control the initiation of outflow from the dispenser hopper 18.

Figure 6:
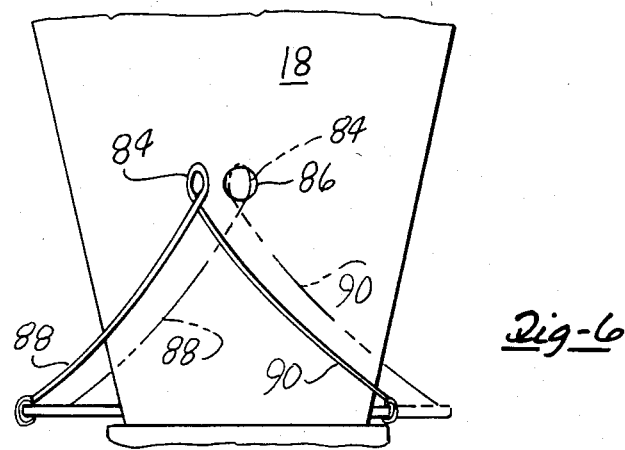
FIG. 6 is a rear elevational fragmentary view of the hopper portion of the dispenser arrangement shown in FIGS. 1-3 showing a damper plate indicator arrangement shown corresponding to the damper plate in the open position, and in phantom corresponding to the damper plate closed position.

Referring to FIG. 6 an indicator arrangement is provided in order to enable ready determination by the vehicle operator of the position of the damper blade 54 without leaving the vehicle cab. This consists of an indicator element 84 positioned at an intermediate height on the rear surface of the hopper 18. A centrally located corresponding indicator mark 86 is formed on the rear surface 18. The indicator marker 84 is supported at this height on the damper plate 54 as by lengths of heavy wire 88 and 90 affixed to either side of the damper plate 54. Side to side motion of the damper plate 54 between the open positions corresponding to the open and closed position of the bottom mount openings 58 moves the marker 84 into and out of registry with the hopper marker 86 to provide to the vehicle operator a ready indication of the position of the damper plate 54.

The dispenser arrangement according to the present invention is also adapted to be rear mounted for vehicles which are not equipped with a snow plow blade.

Figure 8:
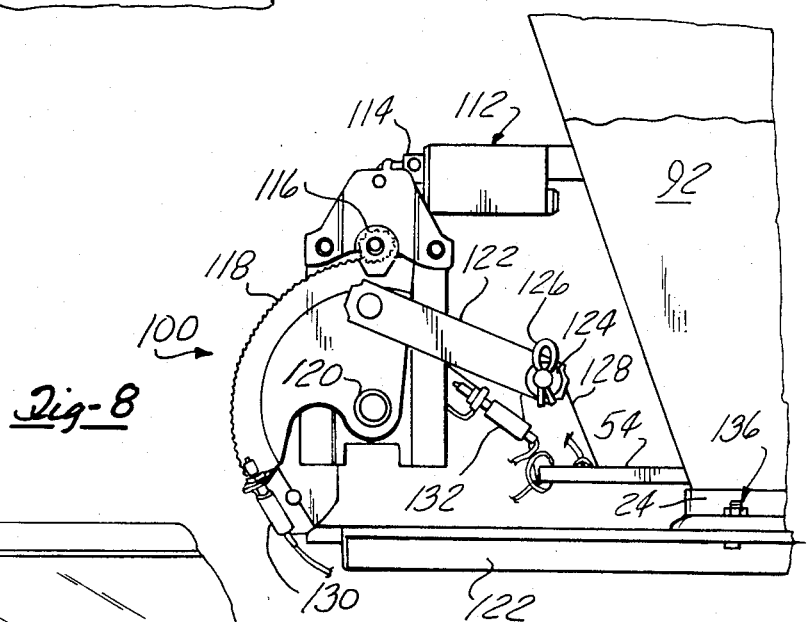
FIG. 8 is a rear perspective view of a fragmentary perspective view of a motor vehicle with the dispenser arrangement of FIG. 7 installed thereon together with a deflector shield.
Figure 7:
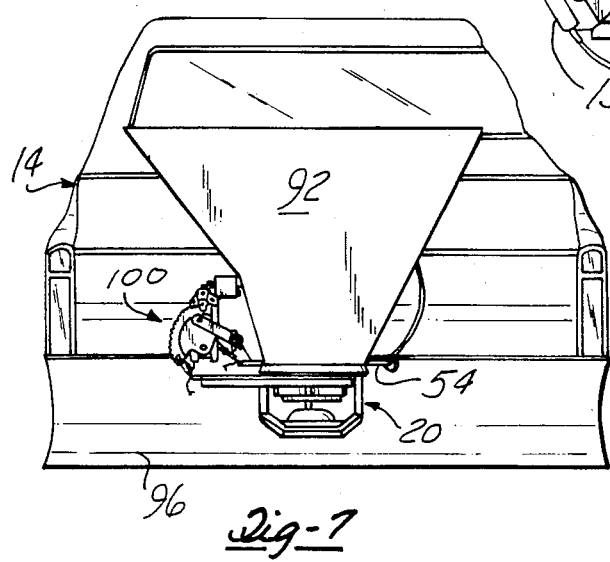
FIG. 7 is a fragmentary rear elevational view of an alternate form of the dispenser attachment according to the present invention adapted for rear mounting and solenoid actuation of the damper plate.
Figure 9:
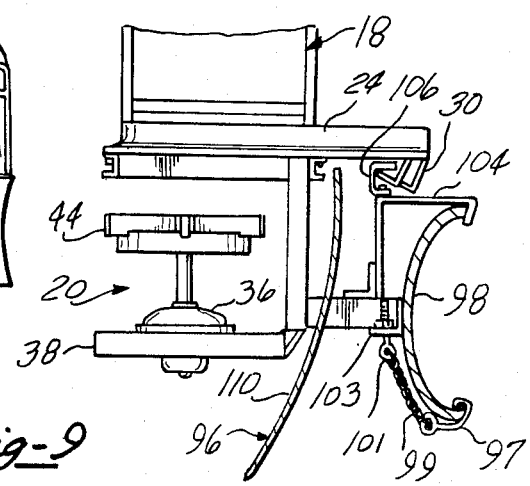
FIG. 9 is a side elevational view of the dispenser arrangement shown in FIGS. 7 and 8.

This arrangement is shown in FIGS. 7-9 in which the dispenser arrangement 90 includes a hopper 92 and a rotor assembly 94 combined with a deflector shield 96 detachably affixed to the rear bumper 98 of the vehicle 14. In this embodiment an electro-actuator 100 is provided for positioning of the damper plate 54.

As seen in FIG. 9, the means for attaching to the bumper 98 includes a catch member 104 adapted to hook over the top edge of the bumper 98 which also serves to mount a catch 106, into which is received the catch rail 30 of the frame 24.

The deflector shield 92 is also welded to a frame 108, welded to the catch member 104, such as to be supported in a rear facing direction. The feed dispenser arrangement 16 is positioned to the rear of the concave surface 110 thereof in order to provide the uniform dispersion of the granular material as it deflects the material emanating from the rotor spreader 20.

The deflector shield 96 prevents the granular material from being directed onto the understructure of the vehicle. The ramdom deflection off such structure accounts in part for the lack of uniformity in conventional rear mounted granular material spreaders, and causes corrosion of the vehicle parts.

A hook 97 is employed to be secured to the lower edge of the bumper 98, with a chain 99 mounted to an eyebolt 101 carried by a cross member 103, enabling tensioning thereof.

An electro-actuator arrangement is adapted to enable remote positioning of the damper plate 54. This includes an electro-actuator 100, which may be of a known design and which includes an actuator solenoid 112 selectively energized by means of dash mounted switching (not shown). An output extension member 114 is moved upon energization, which movement causes rotation of an intermediate gear 116, to in turn cause a segment gear 118 to be rotated about a pivotal mount 120 through a predetermined arc. The rotation thereof causes actuating motion of a link 122 with a pin 124 retained with a cotter pin 126 mounting the link to a pedestal 128 welded to the damper plate 54. Switches 130 and 132 cooperate with the manual switching to ensure stopping of the damper plate 54 at the positions of the damper plate 54 corresponding to opening and closing of the hopper bottom openings 58.

The entire actuation assembly is mounted to a support frame 138, releasably mounted by nuts and bolts 136 to the frame 24 of the dispenser arrangement 16 such that the electro-actuator 100 may be readily removed to convert the unit to snow plow blade mounting.

Accordingly, it can be appreciated that the above recited objects of the present invention have been achieved by the arrangement shown and described herein. The front mounting and central location of the dispenser arrangement, adjacent an outwardly disposed deflector shield which extends across the width of the vehicle, provides a uniform dispersal pattern and protects the vehicle structure from enlodgement of the particles of granular material.

The front mounting of the dispenser arrangement offers the advantage of improved reliability and performance of the unit since the corrosive and freeze-up effects of road spray in the instance of conventional rear mounted spreaders is avoided and at the same time the vulnerability of the unit to impact damage is alleviated by its ready visibility.

In the embodiment in which the dispenser arrangement is mounted to the snow plow the arrangement of the cable and snow plow tilt motion actuation of the damper blade offers the advantage of simplicity inasmuch as no wiring or control is necessary and enables ready removal and installation of the dispenser arrangement.

The three-speed rotor spreader drive motor enables a control over the dispersal area and density of the granular material spread on the road surface.

The means for providing a controlled establishment and disestablishment of flow of the granular material from a hopper is advantageously achieved by the special damper plate design in which the damper blades are formed with a clearance space on three sides thereof for movement into and out of registry with the bottom located holes in the hopper bottom plate which provides a relatively jam-free method of controlling the flow of relatively coarse granular materials such as rock salt. The greatly simplified control arrangement utilizing the tilting motion of the snow plow is advantageously used in installations in which the dispenser arrangement is mounted on a snow plow blade. The assembly is readily attached and detached from the bumper and/or snow plow blade of the motor vehicle.

I claim:

1. In combination with a vehicle equipped with a forward mounted snow plow blade having a concave front surface disposed forward of the vehicle, the improvement comprising:

a road dispenser arrangement for granular material comprising a hopper mounted to the upper edge of said snow plow blade;

said hopper having at least one bottom opening for allowing outflow therefrom;

spreader means mounted to said hopper for directing outflow of road salt from said hopper against said front surface of said snow plow blade;

and means for selectively establishing outflow of road salt from said hopper to said spreader means;

whereby said snow plow blade is tiltable under the selective control of the operator of said vehicle, and wherein said means for controllably establishing outflow from said hopper to said spreader means includes a slidable damper plate slidably mounted beneath said at least one hopper opening, and said damper plate being formed with an opening;

means for causing said damper plate to be moved to bring said damper plate opening into registry with said hopper openings upon tilting movement of said snow plow blade to a predetermined position.

2. The vehicle according to claim 1 wherein said means for moving said damper plate consists of a cable having one and another end connected at said one end to same damper plate and at said other end to a structure on said vehicle fixed with respect to said snow plow blade and whereby said cable causes said plate to be moved by tilting movement of said snow plow blade.

3. The vehicle according to claim 2 further including a second cable attached to the side of said damper plate opposite from said side whereat said first mentioned cable is attached, said second cable being secured at its other end to a structure on said vehicle fixed with respect to said snow plow blade, whereby tilting in one direction enables movement of said damper plate to an open position with said damper plate opening in registry with said hopper bottom opening and wherein tilting in said opposite direction causes return movement of said damper plate to a position whereat said damper plate opening is out of registry therewith.

4. The vehicle according to claim 3 wherein said hopper extends above said snow plow blade and wherein said damper plate further includes an indicator element carried by said damper plate and positioned adjacent to the rear surface of said hopper, and further including an indicator mark on the rear surface of said hopper providing an indication of the position of said damper plate by relative movement of said indicator element and indicator marking whereby said damper plate position may be viewed from within said vehicle.

5. The vehicle according to claim 1 wherein said spreader means includes a spreader rotor mounted forwardly of the front surface of said snow plow blade, and carrying a plurality of radial vanes on the top surface thereof, said spreader rotor being positioned to receive outflow of said road salt from said hopper;

and, means for rotating said spreader rotor to cause dispersal of said road salt to the front of said vehicle and against said snow plow blade front surface thereof for uniform spreading of road salt.

6. The vehicle according to claim 5 wherein said means for rotating said spreader rotor comprises means for selectively rotating said rotor at a plurality of speeds.

7. The vehicle according to claim 1 wherein said hopper and dispenser means are secured together into a single assembly, including mounting means enabling ready attachment and detachment of said assembly to said snow plow blade.

8. A dispenser for dispensing granulated material comprising:

a hopper to receive a quantity of said granulated material, said hopper being provided with at least one opening in the bottom thereof to enable granulated material to pass through said hopper;

means for selectively controlling outflow from said hopper through said opening comprising a movable damper plate, said movable damper plate being mounted for sliding motion across said bottom of said hopper adjacent said hopper bottom opening thereof;

said damper plate formed with an opening positionable by motion of said damper plate into and out of registry with said at least one hopper opening to thereby enable outflow therethrough;

said damper plate further being formed with at least one blade projecting into said opening and adapted to be moved across said hopper opening by motion of said damper plate;

said blade being formed with open areas on three sides thereof so as to allow said damper plate to move over said hopper opening while preventing jams by enabling granular material to escape through said open areas.

9. A dispenser arrangement for dispensing and spreading granular material on a road surface from a vehicle having a tiltable front mounted snow plow blade comprising:

a hopper;

a mounting frame secured to the lower end of said hopper, said hopper being open-topped to be adapted to receive a supply of granular material;

said hopper having at least one opening at the bottom thereof enabling granular material to pass therethrough, means for controllably establishing outflow through said at least one bottom opening;

spreader means consisting of a spreader rotor mounted on said mounting frame for rotation about an axis;

selectively operable means for rotating said spreader rotor about said axis;

said spreader rotor being positioned beneath said at least one hopper opening with said axis extending in a direction towards said at least one opening;

a plurality of spreader vanes formed on the surface of said spreader rotor adjacent said hopper opening;

said dispenser arrangement further including a slidable damper plate and means establishing and disestablishing outflow from said hopper through said at least one hopper opening upon positioning said damper plate in alternate positions;

said damper plate extending across said hopper with exposed ends thereof on either side of said hopper;

means for selectively moving said damper plate to either of said alternate positions;

including means for detachably securing cables to either side of said damper plate to enable alternative operation of said damper plate by attachment of said cables to fixed structure of said vehicle such that upon tilting motion of said snow plow blade alternate positioning of said damper plate is enabled;

means for detachably securing said arrangement to said snow plow blade.

10. A dispenser arrangement for mounting on a motor vehicle to provide a uniformly dispersed flow of granular materials over a road surface traversed by the motor vehicle comprising:

a dispenser hopper adapted to receive a quantity of granular material to be dispersed;

spreader means mounted for rotation directly beneath said hopper, said spreader means comprising a spreader rotor mounted for rotation upon an axis substantially aligned beneath said dispenser hopper, the spreader rotor having a plurality of radial vanes formed thereon adapted to receive an outflow of granular material from said hopper and dispersed by rotation of said spreader rotor;

means for rotating said spreader rotor;

means selectively causing said rotor to be rotated during dispensing of granular material;

means for controllably establishing and disestablishing the outflow of granular material from said hopper onto said spreader rotor;

a deflector shield comprised of an elongated generally blade shaped member of a length to extend substantially entirely across the width of said motor vehicle, said deflector shield having an outer surface facing said spreader rotor adapted to be mounted transversely to said vehicle with said dispenser assembly disposed on said outer surface thereof whereby rotation of said spreader rotor directs granular material against said deflector shield causing a uniform depositing of granular material on the road surface traversed by said motor vehicle;

and, means for mounting said dispenser arrangement and said deflector shield to said motor vehicle with said deflector shield extending substantially entirely across the width of said vehicle, wherein said deflector shield is formed with a concave surface extending transversely to said motor vehicle width and wherein said dispenser hopper is mounted above said concave deflector shield surface and said rotor spreader is positioned to cause a flow of granular material received from said hopper to be directed against said deflector shield concave surface.

* * * * *

UNITED STATES PATENT AND TRADEMARK OFFICE
CERTIFICATE OF CORRECTION

PATENT NO. : 4,491,275
DATED : January 1, 1985
INVENTOR(S) : Herbert Holsworth

It is certified that error appears in the above-identified patent and that said Letters Patent are hereby corrected as shown below:

Column 4, line 29, "ede" should be --edge--.

Column 6, line 38, "92" should be --96--.

Column 8, line 12, "same" should be --said--.

Signed and Sealed this

Twenty-third Day of April 1985

[SEAL]

Attest:

DONALD J. QUIGG

Attesting Officer

Acting Commissioner of Patents and Trademarks